US008762239B2

(12) United States Patent
Maw

(10) Patent No.: US 8,762,239 B2
(45) Date of Patent: Jun. 24, 2014

(54) NON-FINANCIAL TRANSACTIONS IN A FINANCIAL TRANSACTION NETWORK

(75) Inventor: Brian Jeffrey Maw, Belmont, CA (US)

(73) Assignee: Visa U.S.A. Inc., San Francisco, CA (US)

(*) Notice: Subject to any disclaimer, the term of this patent is extended or adjusted under 35 U.S.C. 154(b) by 681 days.

(21) Appl. No.: 12/352,440

(22) Filed: Jan. 12, 2009

(65) Prior Publication Data
US 2010/0179891 A1 Jul. 15, 2010

(51) Int. Cl.
G07B 17/00 (2006.01)
(52) U.S. Cl.
USPC .................................. 705/35; 705/44; 705/30
(58) Field of Classification Search
None
See application file for complete search history.

(56) References Cited

U.S. PATENT DOCUMENTS

| 6,098,879 | A | 8/2000 | Terranova |
| 6,330,546 | B1 | 12/2001 | Gopinathan et al. |
| 6,601,048 | B1 | 7/2003 | Gavan et al. |
| 7,158,947 | B1 | 1/2007 | Findley |
| 7,251,624 | B1 | 7/2007 | Lee et al. |
| 7,433,855 | B2 | 10/2008 | Gavan et al. |
| 2003/0097330 | A1 | 5/2003 | Hillmer et al. |
| 2004/0199787 | A1* | 10/2004 | Hans et al. ............... 713/200 |
| 2005/0125342 | A1 | 6/2005 | Schiff |
| 2006/0149603 | A1 | 7/2006 | Patterson et al. |
| 2007/0061259 | A1 | 3/2007 | Zoldi et al. |
| 2007/0106582 | A1 | 5/2007 | Baker et al. |
| 2007/0136199 | A1 | 6/2007 | Findley |
| 2007/0185821 | A1 | 8/2007 | Wells et al. |
| 2007/0192249 | A1 | 8/2007 | Biffle et al. |
| 2007/0282674 | A1 | 12/2007 | Gomes et al. |
| 2009/0006203 | A1* | 1/2009 | Fordyce et al. ............. 705/14 |
| 2009/0266881 | A1 | 10/2009 | Hammad |
| 2009/0271211 | A1 | 10/2009 | Hammad |
| 2010/0100424 | A1* | 4/2010 | Buchanan et al. ........... 705/10 |

FOREIGN PATENT DOCUMENTS

KR 10-2001-0100380 A 11/2001

OTHER PUBLICATIONS

U.S. Appl. No. 61/048,814, filed Apr. 29, 2008.
EMV 96 "Integrated Circuit Card Specification for Payment System", Version 3.0, Jun. 30, 1996.
"EMV '96: Integrated Circuit Card Specification for Payment Systems"; Jun. 30, 1996, 187 pages.
International Search Report for Application No. PCT/US2010/020802, mailed Aug. 17, 2010, 3 pages.

* cited by examiner

Primary Examiner — Mussa A Shaawat
(74) Attorney, Agent, or Firm — Kilpatrick Townsend Stockton LLP

(57) ABSTRACT

A financial transaction system includes a computer readable storage medium and a processor in communication with the computer readable storage medium. The processor is configured for receiving a plurality of messages. The plurality of messages including financial transaction authorization messages for performing a financial transaction. At least one of the plurality of messages includes non-financial data. The processor is further configured for parsing each of the plurality of messages to identify data for performing the financial transaction and the non-financial transaction data contained in the plurality of messages, and for storing the data for performing the financial transaction and the non-financial transaction data in a computer readable storage medium such that the non-financial transaction data is associated with data for performing the financial transaction.

23 Claims, 5 Drawing Sheets

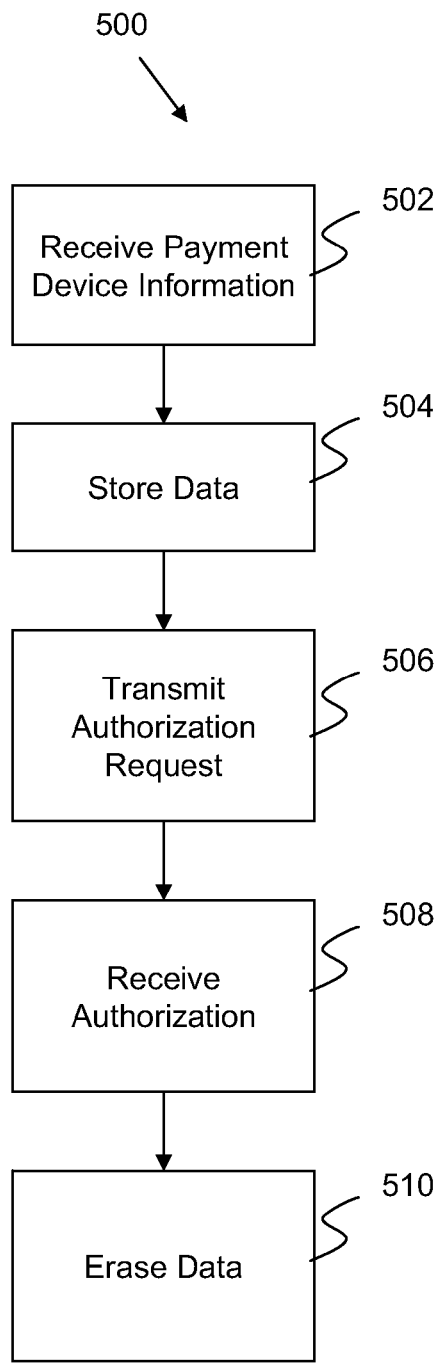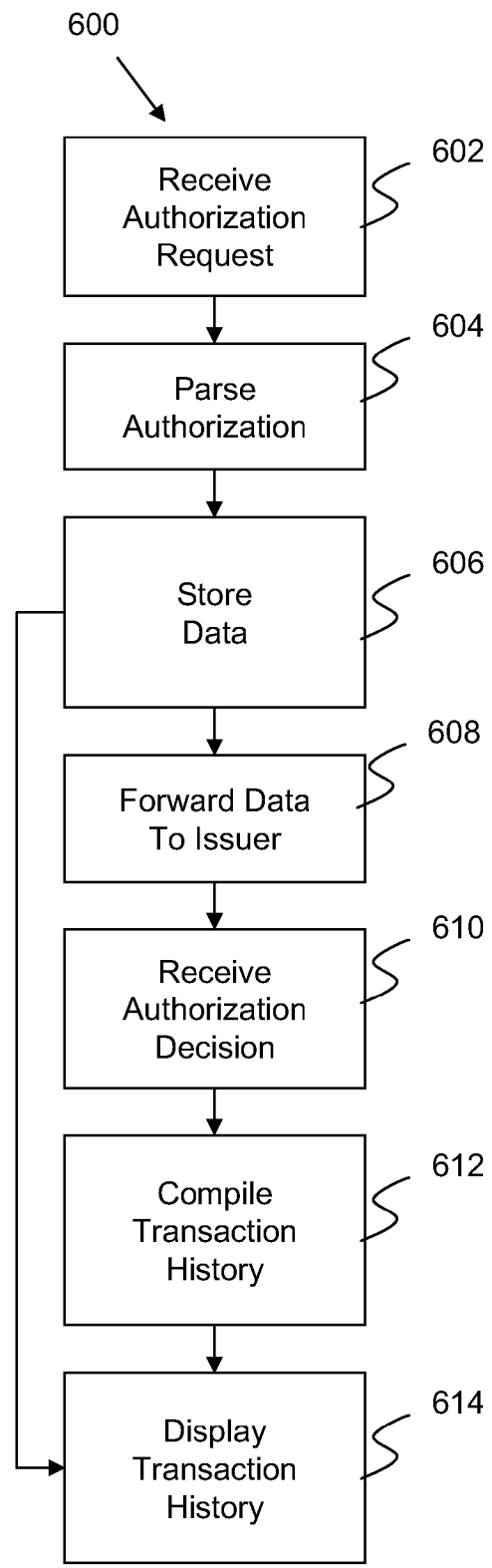
FIG. 5
FIG. 6

NON-FINANCIAL TRANSACTIONS IN A FINANCIAL TRANSACTION NETWORK

CROSS-REFERENCE TO RELATIONS APPLICATIONS

None

FIELD OF DISCLOSURE

The disclosed system and method relate to financial services. More specifically, the disclosed system and method relate to the transfer of non-financial data in a financial transaction network.

BACKGROUND

Payment devices, such as credit/debit cards or contactless devices (e.g., "PAY WAVE"™) are used in various financial transactions including credit purchases, debit purchases, cash advances, and payroll transactions. During the financial transaction, authorization messages that include the financial details about the transaction are transmitted from a point-of-sale (POS) terminal located at a merchant to an acquirer (e.g., a financial institution). The acquirer obtains from the financial institution that issued the payment device ("the issuer") information regarding the credit worthiness of the cardholder, and whether the account has sufficient funds or credit to perform the transaction.

The acquirer then forwards the financial transaction information to a payment processor, such as Visa, MasterCard, or American Express, which then performs the remainder of the financial transaction along with the issuer (e.g., commercial bank through which the payment device was issued). The only data that are transmitted in these conventional payment device financial transactions identify the amount of the transaction, the account (e.g., card number) performing the transaction and possibly the location where the transaction is occurring. Aside from these details, little is known about the financial transaction.

An improved system and method of performing a financial transaction is desirable.

SUMMARY

A financial transaction system includes a computer readable storage medium and a processor in communication with the computer readable storage medium. The processor is configured to receive a plurality of messages. The plurality of messages including financial transaction authorization messages for performing a financial transaction. At least one of the plurality of messages includes non-financial data. The processor is further configured to parse each of the plurality of messages to identify data for performing the financial transaction and the non-financial transaction data contained in the plurality of messages, and to store the data for performing the financial transaction and the non-financial transaction data in a computer readable storage medium such that the non-financial transaction data is associated with data for performing the financial transaction.

In some embodiments, a method includes receiving a plurality of messages. The plurality of messages includes financial transaction authorization messages for performing a financial transaction. At least one of the plurality of messages includes non-financial data relating to the financial transaction. The method further includes parsing each of the plurality of messages to identify data for performing the financial transaction and the non-financial transaction data contained in the plurality of messages, and storing the data for performing the financial transaction and the non-financial data in a computer readable storage medium such that the non-financial data is associated with the financial transaction data.

In some embodiments, a method includes receiving data from a payment device, storing data for performing a financial transaction including the data received from the payment device and non-financial transaction data in a computer readable storage medium, transmitting the data for performing the financial transaction in a financial transaction authorization message to one of an acquirer or a payment processor, and transmitting the non-financial data to the payment processor. The non-financial data relates to the financial transaction.

BRIEF DESCRIPTION OF THE DRAWINGS

FIG. 5 is a flow diagram of a process for communicating non-financial transaction data during a financial transaction.

FIG. 6 is a flow diagram of a process that may be implemented in a payment processor in accordance with the process shown in FIG. 5.

DETAILED DESCRIPTION

Figure 1:
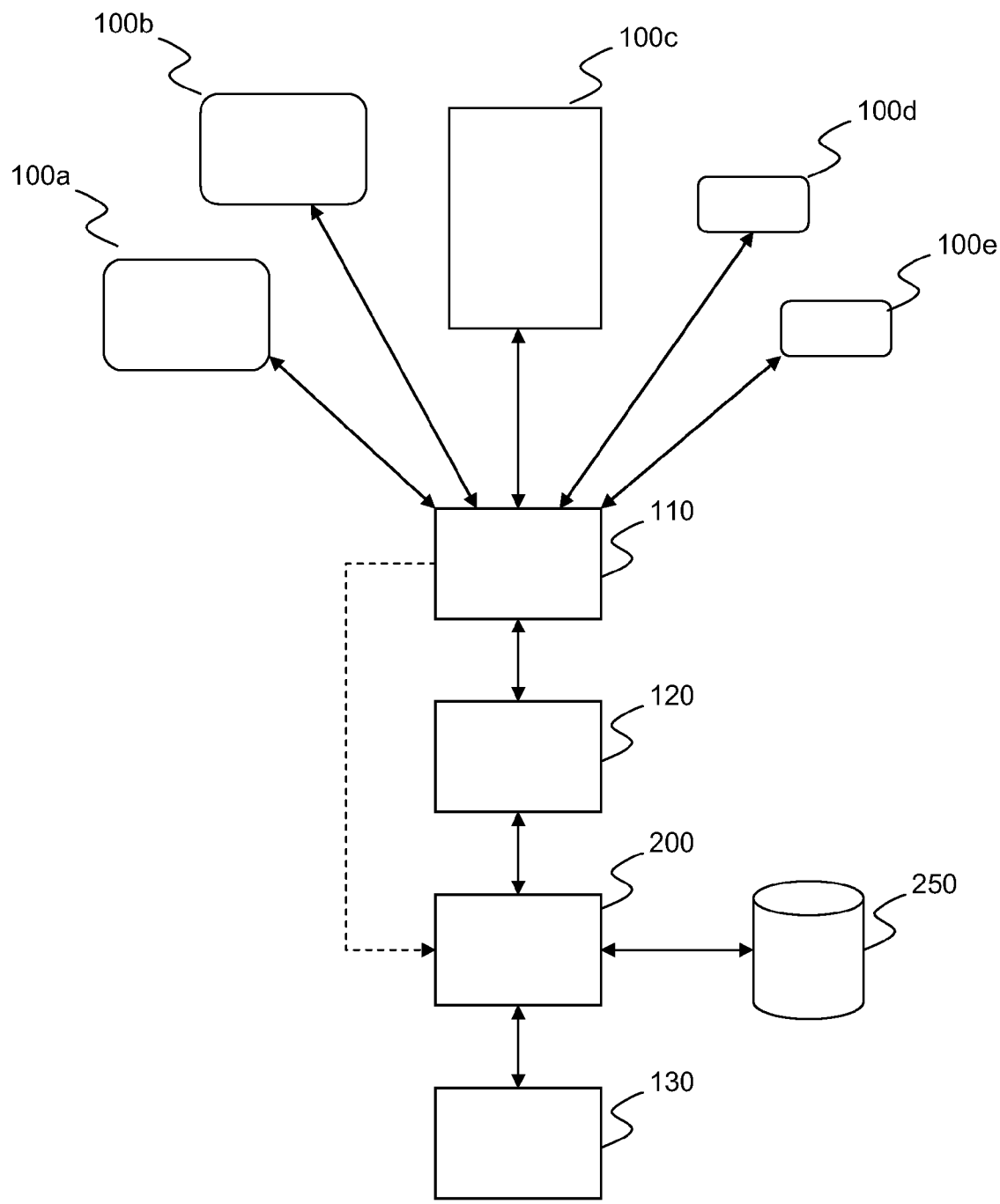
FIG. 1 illustrates an embodiment of a system configured to transmit financial and non-financial through a financial transaction network.

FIG. 1 illustrates a financial transaction system involving a payment device 100a-100e through which non-financial transaction data may be transmitted, processed, and stored. A payment device 100a-100e may be any credit, debit, or financial transaction device, mobile phone, or identification card capable of storing financial and non-financial data for use in a financial transaction. Examples of payment devices include, but are not limited to, a standard payment device 100a, a radio frequency (also known as "contactless" or "PAY WAVE"™) payment device 100b, a mobile phone device 100c, a minicard 100d, micro tag 100e, payment fob, or any other payment device that may be used to perform a financial transaction.

Also shown in FIG. 1 is the merchant point of sale (POS) terminal 110, the acquirer 120, the payment processor 200 (such as the "VISANET" network operated by VISA, Inc. of Foster City, Calif.) with its database 250, and the payment device issuer 130. As used herein, acquirer 120 refers to one or more computer processors or networks owned and/or operated by an acquirer entity. The payment processor 200 refers to one or more computer processors or networks owned and/or operated by a payment processing entity. The issuer 130 refers to one or more computer processors or networks owned or operated by an issuer financial institution. Thus, blocks 110, 120, 200 and 130 include particular machines coupled to each other directly or indirectly by one or more communications networks.

A financial transaction may be any operation involving transfer of funds to or from at least one account using a payment device, whether a payment, reimbursement, or any other interaction using a payment device. Financial transactions may be credit, debit, charge, prepaid, or payroll transactions as examples.

Figure 3:
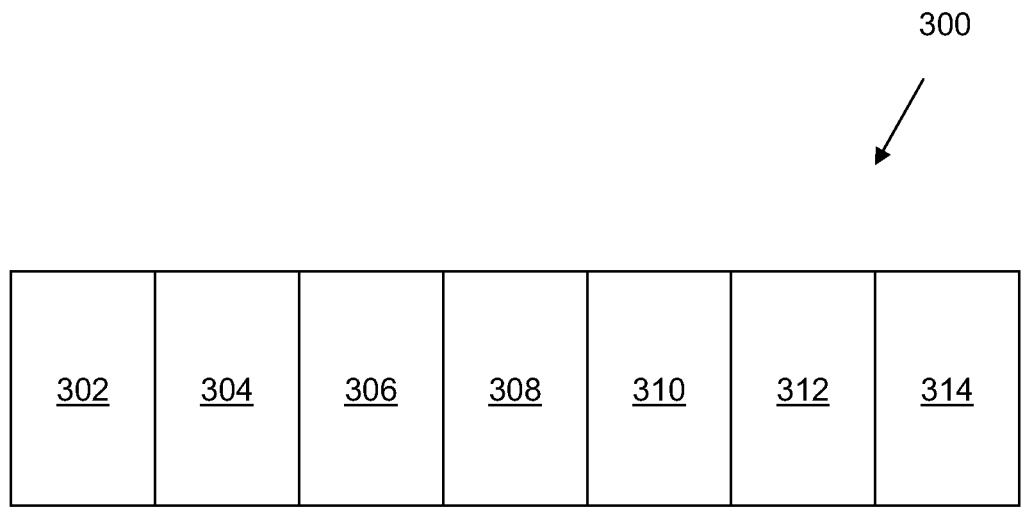
FIG. 3 is table showing an embodiment configured to store tags of information on a payment card or device.

Payment devices 100a-100e may include various types of stored information. FIG. 3 depicts a data field 55 (also referred to as "Field 55"), which is a memory field on payment device 100a-100e that may be configured to store financial and non-financial information. In some embodiments, the memory field is in a computer chip within payment device 100a-100e. Although implementations of Field 55 may vary in size, in some embodiments may be limited to a maximum of 255 bytes of data. One of the features of Field 55 is the ability to allow personalization values in the authorization messages. These values are also known as tags or data structures. Field 55 tags may include data embedded in the chip that the issuer 130 requests to receive in an authorization message.

In one embodiment of Field 55, the Field 55 data elements may include: an amount authorized 302, an unpredictable number 304, an application transaction counter (ATC) 306, issuer application data (IAD) 308, an application cryptogram 310, customer exclusive data 312, and a form factor identifier 314.

The customer exclusive data field 312 is now described. Examples of the information that may be included in the customer exclusive data field 312 include non-financial data concerning a financial transaction. For example, the non-financial transaction data may identify each leg of airline flight purchase, a description and quantity of each item purchased at a supermarket or retail store, the number of frequent flier miles accumulated, an itemization of a bill for a hotel stay (i.e., an identification of all incidental charges occurred during the stay such as mini-bar purchases or movie rentals), or the like. One skilled in the art will understand that the information that may be collected is not limited to these examples, but may include any information surrounding a financial transaction.

Figure 4:
FIG. 4 is a table showing an embodiment of a message that may be used to transmit non-financial data through a financial transaction network.

The data stored in Field 55 may be stored in any format. FIG. 4 illustrates one embodiment of a Tag-Length-Value format in which the data may be stored. Tag 402 identifies the position of the information, length 404 identifies the length of the information, and the value 406 carries the information or payload data. The Tag-Length-Value format of FIG. 4 may be used for any or all of the elements 302-314 of Field 55 shown in FIG. 3.

Referring again to FIG. 1, a consumer or card holder may use the payment device/card 100 at a payment device/card reader or POS terminal located at a merchant 110. In some embodiments, a reader and POS terminal may be implemented together as a single device. The reader receives information from the payment device 100, which may include the information described above with respect to Field 55. The received information may be processed by the POS terminal at the merchant 110.

In some embodiments, the reader or POS terminal at merchant 110 may immediately transmit the appropriate data to perform a financial transaction (e.g., the amount of the transaction, location of the transaction, payment device account number, etc.) as well as non-financial transaction data in one or more authorization messages to an acquirer 120. The non-financial data may be stored in Field 55, or a flexible record structure. The acquirer 120 may obtain information from the issuer 130 to determine whether the cardholder is credit worthy or whether the account has sufficient funds on the payment device to pay for the transaction. The acquirer 120 will then forward the financial and non-financial data in the authorization messages to a payment processor 200. In some embodiments, the information from the merchant 110 may bypass the acquirer 120 and be sent directly to the payment processor 200 as shown in FIG. 1. The payment processor 200 is configured to parse or use the data stored on the payment device/card 100 in a financial transaction and a non-financial transaction.

Figure 2:
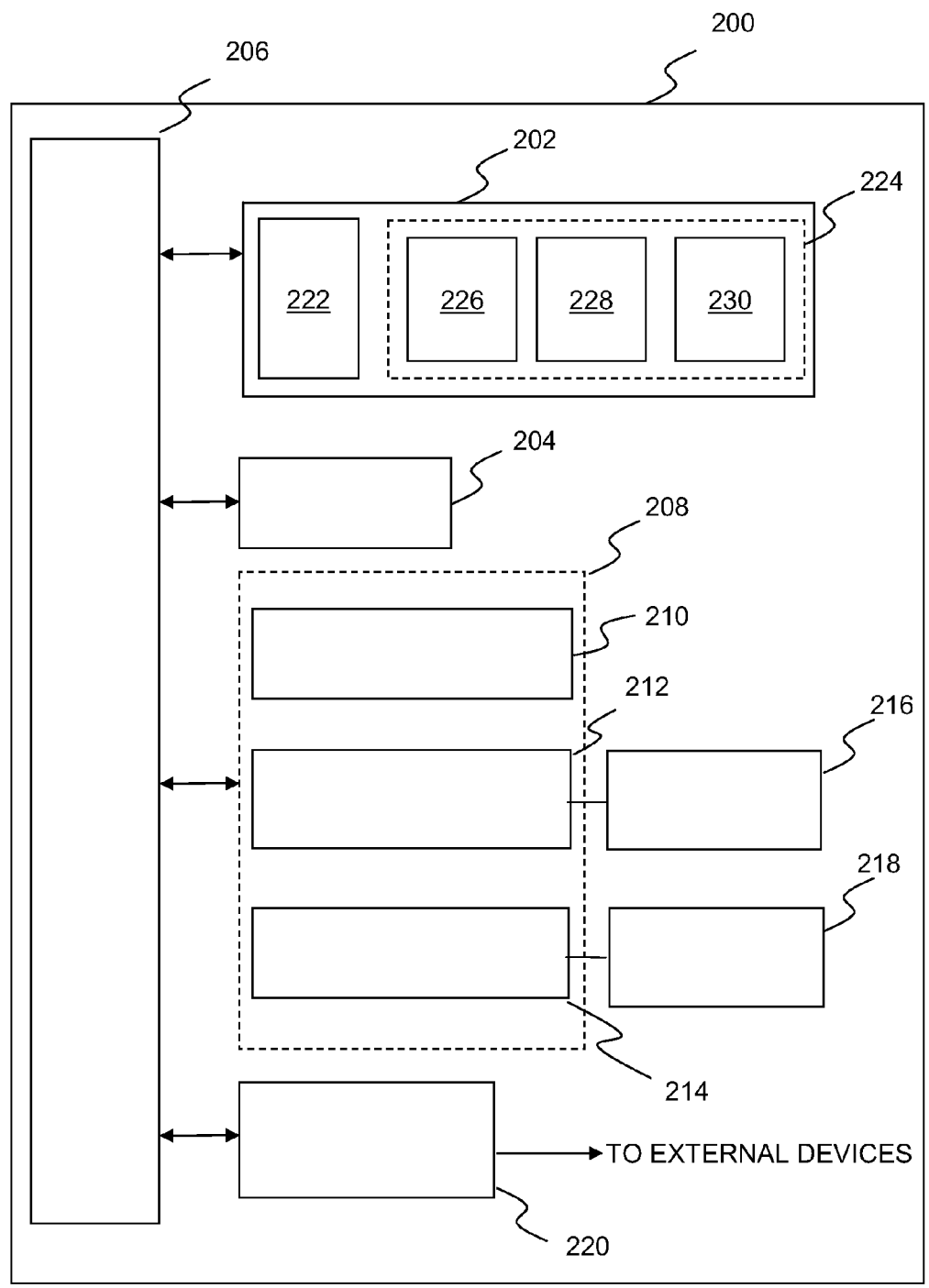
FIG. 2 is a block diagram of a payment processor.

One example of an architecture of a payment processor 200 is illustrated in FIG. 2. Payment processor 200 may be a server, computer, group of servers, group of computers, or any other device or devices that may be configured to transmit, receive, and/or store financial and non-financial transaction data. As shown in FIG. 2, payment processor 200 may include one or more processors 202, which may be connected to a wired or wireless communication infrastructure 206 (e.g., a communications bus, cross-over bar, local area network (LAN), or wide area network (WAN)). Processor 202 may be any central processing unit, microprocessor, micro-controller, computational device, or like device. Processors 202 may be configured to run one or more multitasking operating systems.

In some embodiments, processor 202 may be functionally comprised of a data processor 222 and a fraud prevention engine 224. Fraud prevention engine 224 may further include a data parser 226, a form factor identifier 228, and a customer data manager 230. These structures may be implemented as hardware, firmware, or a programmed processor executing software encoded on a computer readable medium, such as main memory 204 or secondary memory 208.

Payment processor 200 may include a main memory 204, such as a random access memory (RAM). Payment processor 200 may also include a secondary memory 208 such as, for example, a hard disk drive 210 and/or removable storage drive 212, representing a floppy disk drive, a magnetic tape drive, an optical disk drive, or the like. The removable storage drive 212 may read from and/or write to a removable storage unit 216. Removable storage unit 216 may be a floppy disk, magnetic tape, CD-ROM, DVD-ROM, optical disk, blu-ray disk, ZIP™ drive, and the like, which may be written to and/or read by removable storage drive 212. Removable storage unit 216 may include a machine readable storage medium having stored therein computer software and/or data.

In some embodiments, secondary memory 208 may include other similar devices for allowing computer programs or other instructions to be loaded into server 200 such as a removable storage device 218 and a removable storage interface or socket 214. An example of such a removable storage device 218 and socket 214 includes, but is not limited to, a USB flash drive and associated USB port, respectively. Other removable storage devices 218 and interfaces 214 that allow software and data to be transferred from the removable storage device 218 to server 200 may be used.

Payment processor 200 may also include a communications interface 220. Communications interface 220 allows software and data to be transferred between payment processor 200 and external devices, e.g., devices residing at a location of an issuer 130, acquirer 120, merchant 110, etc. Examples of communications interface 220 may include a modem, a network interface (such as an Ethernet card), a communications port, a Personal Computer Memory Card International Association (PCMCIA) slot and card, or the like. Software and data transferred via communications interface 220 are in the form of signals which may be electronic, electromagnetic, optical, or any other signal capable of being received by communications interface 220. These signals are provided to communications interface 220 via a communications path or channel. The path or channel that carries the signals may be implemented using wire or cable, fiber optics, a telephone line, a cellular link, a radio frequency (RF) link, and the like.

Data parser 226 associated with the fraud prevention engine 224 may be configured to parse and address the Field 55 data tags. In some embodiments, data parser 226 further performs editing, storage, distribution, monitoring, and reporting functions. Once the payment processor 200 parses the financial information, it may then forward the parsed financial information to the payment card issuer 130.

Data parser 226 may also process the non-financial transaction data and store it in a database. The database may be located in main memory 204 or secondary memory 208. In some embodiments, the non-financial data is stored in the cardholder database 250 such that it is associated with a specific cardholder account. In some embodiments, the non-financial transaction data is stored in a cardholder database 250 and is associated with a specific financial transaction. The non-financial data enables the payment processor 200 to determine the spending patterns and habits of cardholder to more precisely target advertisements and special loyalty and awards programs. Additionally, if the payment processor 200 gives the issuer financial institutions 130 access to the non-financial data, the non-financial data enables the issuers 130 to provide cardholders with detailed information about their own spending patterns as the cardholders may be able to view details about their purchases in monthly statements or by accessing their accounts online.

In some embodiments, once the payment device 100 is swiped at a reader or POS terminal at merchant 110, the information used to perform a financial transaction is immediately transmitted to an acquirer 120 or a payment processor 200 and the financial transaction data is immediately processed as described above. In these embodiments, the non-financial data may be locally stored at the terminal or reader 110 and transmitted to a payment processor 200 at a later time.

In some embodiments, the merchant 100 will transmit the non-financial data to a payment processor 200 once the financial transaction has been completed, e.g., once the authorization to perform the transaction is received at the reader or terminal located at the merchant 110. In some embodiments, the merchant 110 may transmit the non-financial transaction data for one or more financial transactions on an hourly basis. In some embodiments, the merchant 110 may transmit the non-financial transaction data to the payment processor 200 on a daily basis. One skilled in art will understand that the non-financial transaction data may be transmitted to payment processor 200 at any time after performing the financial transaction, e.g., every few minutes, hours, months, or the like.

As described above, the merchant 110 may transmit the non-financial transaction data to payment processor 200 by embedding the non-financial data in Field 55, or another flexible record structure. In some embodiments, merchant 110 may transmit the non-financial transaction data to payment processor 200 by using Internet Protocol (IP) based messages. For example, merchant 110 may use IP protocol to transmit non-financial transaction data to payment processor 200 in the form of XML strings, file-based format messages, or the like. The messages may be transmitted from merchant 110 or acquirer 120 to the payment processor 200 in accordance with the tag format illustrated in FIG. 4. Accordingly, upon receipt of the messages, data parser 226 of payment processor 200 may parse the non-financial transaction data and store it in a cardholder database 250.

FIG. 5 is a flow diagram of a process 500 for communicating non-financial transaction data during a financial transaction. It is understood by one skilled in the art that the process 500 is performed at a point-of-sale (POS) or at another merchant 110 location. As shown in FIG. 5, the payment device is swiped and the payment device reader/terminal receives the information from the payment device at block 502. Data may also be obtained from information regarding the cardholder as maintained by the merchant 110 or acquirer 120. At block 504, the non-financial data and the financial transaction data are locally stored in a computer readable storage medium at the POS or merchant 110.

At block 506, a request for authorization is transmitted from the POS or merchant 110 to an acquirer 120 or directly to a payment processor 200. An authorization response is received at the POS or merchant 110 at block 508. At block 510, the POS or merchant 110 erases the non-financial data from the local memory and the financial transaction is completed.

FIG. 6 is a flow diagram of a process 600 that may be implemented in a payment processor 200 in response to the process 500 described above. As shown in FIG. 6, the request for authorization message is received at the payment processor 200 at block 602. At block 604, the authorization message is parsed by the payment processor 200 as described above.

At block 606, the non-financial transaction data is stored in a database. The non-financial data may be stored in a database such that it is associated with the financial transaction data or with the cardholder's account. Payment processor 200 forwards the financial transaction data to issuer at block 608 and receives an authorization decision at block 610, which it forwards to either an acquirer 120 or directly to merchant 110 for completion of the financial transaction.

At block 612, the payment processor 200 may compile the financial transaction history for a particular cardholder to determine the spending preferences of the user. For example, by analyzing all of the transactions for a period of time, e.g., a month, sixth months, one year, etc., it may be evident that the cardholder has an affinity for certain products or services. This information may then be transmitted or otherwise communicated to third parties, such as merchants 110, issuers 130, or the like, so that they may strategically target advertising and promotional activities to the cardholder. One skilled in the art will understand that is only one of many possible uses of the data.

At block 614, the payment processor 200 may display the cardholder's transaction history to the cardholder. In some embodiments, the cardholder's transaction history may be displayed to the cardholder in the form of a paper or electronic statement via the Internet, email, or the like. For example, the cardholder logs onto a personal account using a web browser and views his or her statement.

Figure 7:
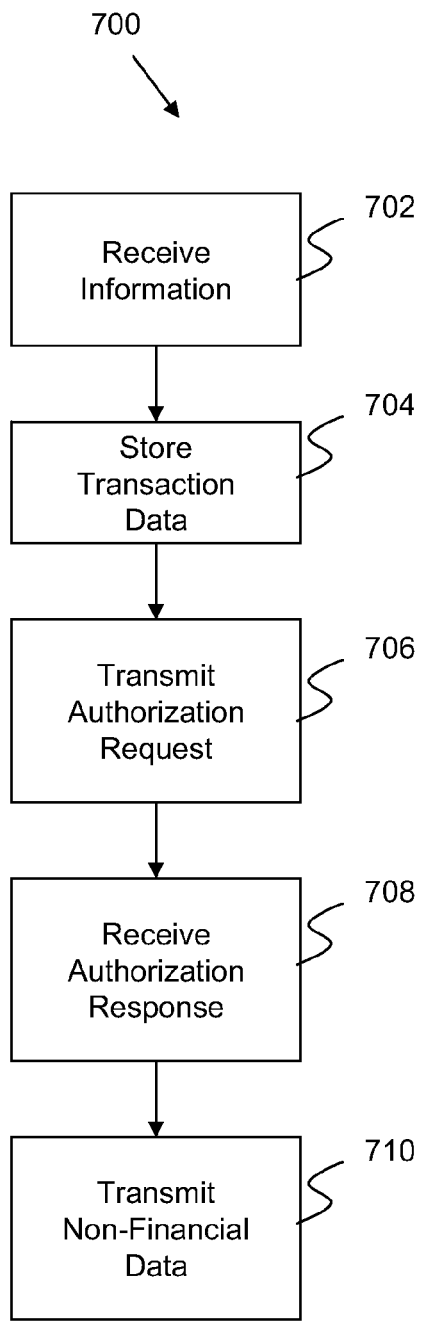
FIG. 7 is a flow diagram of another embodiment of a process for communicating non-financial transaction data during a financial transaction.

FIG. 7 is a flow diagram of another embodiment of a process 700 for communicating non-financial transaction data during a financial transaction. It is understood by one skilled in the art that the process 700 may be performed at a POS, at a merchant 110, or other location. As shown in FIG. 7, the payment device is swiped at the payment device reader/terminal, which receives the information stored on the payment device at block 702. Data may also be obtained from information regarding the cardholder as maintained by a merchant 110 or acquirer 120. At block 704, copies of the financial and non-financial data concerning the transaction are stored at the merchant 110.

A request for authorization containing only the data required to perform the financial transaction is transmitted from the merchant 110 to the either the acquirer 120 or directly to the payment processor 200 at block 706. At block 708, the POS reader/terminal receives an authorization response from either the acquirer 120 or the payment processor 200.

At block 710, the merchant 110 will transmit the non-financial transaction data concerning the financial transaction to the payment processor 200. As described above, block 710 may be performed immediately after receiving the authorization response from the acquirer 120 or payment processor 200, or block 710 may be performed at some later time, e.g., a few minutes, an hour, several hours, days, etc.

Figure 8:
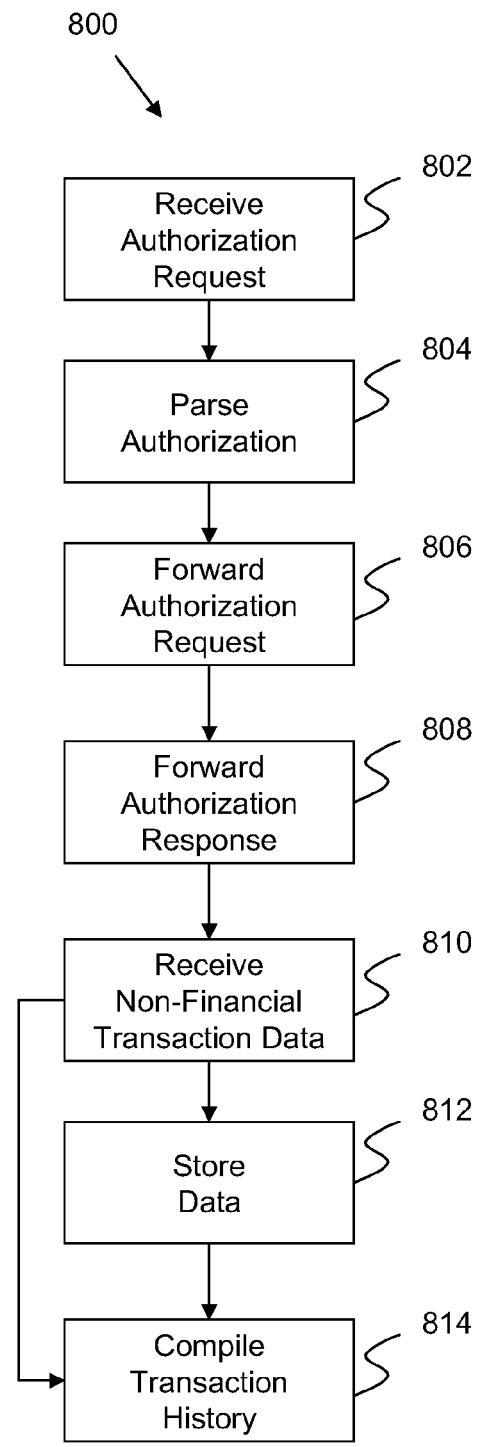
FIG. 8 is a flow diagram of another embodiment of a process that may be implemented in a payment processor in accordance with the process shown in FIG. 7.

FIG. 8 is a flow diagram of a process 800 that may be performed by payment processor 200 in response to the process 700 described above. As shown in FIG. 8, the request for authorization message is received at the payment processor 200 at block 802. The authorization message received at payment processor 200 does not include the non-financial data within the message.

At block 804, the authorization message is parsed and forwarded to the issuer 130 by the payment processor 200 as described above. The payment processor 200 forwards the authorization message including the data necessary to perform a financial transaction to the issuer 130 at block 806, and at block 808 the payment processor 200 receives and forwards the authorization response from the issuer 130 to the acquirer 120 or directly to merchant 110 to complete the financial transaction.

At block 810, the payment processor 200 receives the non-financial transaction data from the merchant 110. As described above, the merchant 110 may transmit the non-financial data using IP or other messaging protocols.

At block 812, the payment processor 200 may store the non-financial data in a database. The non-financial data may be stored in the database such that it is associated with the specific financial transaction. The payment processor 200 may compile the transaction history for a particular cardholder to determine the spending preferences of the user at block 814 as described above.

The system and methods described above enable enhanced information to be gathered concerning a financial transaction at the time the transaction occurs. The ability to acquire and store detailed information about financial transaction enables cardholders to better identify and understand their spending habits. Additionally, the details concerning cardholder spending habits enables issuers, merchants, and other consumer oriented companies to provide targeted marketing and advertising to consumers who use their products or services. One skilled in the art will understand that this is only one of several uses of the data.

The present invention may be embodied in the form of computer-implemented processes and apparatus for practicing those processes. The present invention may also be embodied in tangible machine readable storage media encoded with computer program code, such as random access memory (RAM), floppy diskettes, read only memories (ROMs), CD-ROMs, hard disk drives, flash memories, or any other machine-readable storage medium, wherein, when the computer program code is loaded into and executed by a computer, the computer becomes a particular machine for practicing the invention. When implemented on a general-purpose processor, the computer program code segments configure the processor to create specific logic circuits. The invention may alternatively be embodied in a digital signal processor formed of application specific integrated circuits for performing a method according to the principles of the invention.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A financial transaction system, comprising:
 a computer readable storage medium; and
 a processor in communication with the computer readable storage medium, the processor configured to:
  receive, from a reader device, a plurality of messages after the reader device has read non-financial transaction data relating to a financial transaction from a payment device storing the non-financial transaction data, the plurality of messages including:
   a financial transaction authorization request message for performing the financial transaction; and
   non-financial data including the non-financial transaction data relating to the financial transaction, the non-financial transaction data being transmitted from the reader device after the reader device has received a financial transaction authorization response message for completing the financial transaction, wherein the non-financial transaction data is erased from the reader device after transmission of the non-financial transaction data
  parse each of the plurality of messages to identify data for performing the financial transaction and the non-financial transaction data contained in the plurality of messages; and
  store the data for performing the financial transaction and the non-financial transaction data in a computer readable storage memory such that the non-financial transaction data is associated with the data for performing the financial transaction.

2. The financial transaction system of claim 1, wherein the processor is further configured to generate a report based on the financial and non-financial data, the report identifying a spending pattern of a cardholder.

3. The financial transaction system of claim 1, wherein the non-financial transaction data stored in the memory of the payment device comprises customer exclusive data including one or more personalization values.

4. The financial transaction system of claim 3, wherein the customer exclusive data stored in the memory of the payment device comprises a description or quantity of a good or service purchased.

5. The financial transaction system of claim 1, wherein the memory of the payment device stores one or more of:
 an amount authorized;
 an unpredictable number;
 an application transaction counter;
 issuer application data;
 an application cryptogram; or
 a form factor identifier.

6. The financial transaction system of claim 1, wherein the non-financial transaction data stored in the memory of the payment device is stored in a Tag-Length-Value format comprising a tag identifying the position of the non-financial transaction data in the memory and a length identifying the length of the non-financial transaction data.

7. The financial transaction system of claim 1, wherein the processor is further configured to determine a pattern based at least in part on the non-financial transaction data associated with the data for performing the financial transaction, wherein the pattern indicates a spending preference of a payment account associated with the financial transaction.

8. The financial transaction system of claim 1, wherein the non-financial data being received includes non-financial transaction data relating to a plurality of financial transactions.

9. The financial transaction system of claim 1, wherein the financial transaction system receives non-financial data at a periodic interval.

10. A computer-implemented method, comprising:
receiving, by a computer from a reader device, a plurality of messages via a network after the reader device has read non-financial transaction data relating to a financial transaction from a payment device storing the non-financial transaction data, the plurality of messages including:
a financial transaction authorization request message for performing the financial transaction; and
non-financial data including the non-financial transaction data relating to the financial transaction, the non-financial transaction data being transmitted from the reader device after the reader device has received a financial transaction authorization response message for completing the financial transaction, wherein the non-financial transaction data is erased from the reader device after transmission of the non-financial transaction data;
parsing, by the computer, each of the plurality of messages to identify data for performing the financial transaction and the non-financial transaction data contained in the plurality of messages; and
storing the data for performing the financial transaction and the non-financial transaction data in a computer readable storage medium such that the non-financial transaction data is associated with the financial transaction data.

11. The computer-implemented method of claim 10, wherein the non-financial transaction data stored in the memory of the payment device comprises customer exclusive data including one or more personalization values.

12. The computer-implemented method of claim 11, wherein the customer exclusive data stored in the memory of the payment device comprises a description or quantity of a good or service purchased.

13. The computer-implemented method of claim 10, wherein the non-financial transaction data stored in the memory of the payment device is stored in a Tag-Length-Value format comprising a tag identifying the position of the non-financial transaction data in the memory and a length identifying the length of the non-financial transaction data.

14. The computer-implemented method of claim 10, further comprising determining a pattern based at least in part on the non-financial transaction data associated with the data for performing the first financial transaction, wherein the pattern indicates a spending preference of a payment account associated with the first financial transaction.

15. The computer-implemented method of claim 10, wherein the non-financial data being received includes non-financial transaction data relating to a plurality of financial transactions.

16. A non-transitory computer readable storage medium encoded with program code, wherein when the program code is executed by a processor, the processor performs a method, the method comprising:
receiving, from a reader device, a plurality of messages via a network after the reader device has read non-financial transaction data relating to a financial transaction from a payment device storing the non-financial transaction data, the plurality of messages including:
a financial transaction authorization request message for performing the financial transaction; and
non-financial data including the non-financial transaction data relating to the financial transaction, the non-financial transaction data being transmitted from the reader device after the reader device has received a financial transaction authorization response message for completing the financial transaction, wherein the non-financial transaction data is erased from the reader device after transmission of the non-financial transaction data;
parsing each of the plurality of messages in a computer processor configured to identify data for performing the financial transaction and the non-financial transaction data contained in the plurality of messages; and
storing the data for performing the financial transaction and the non-financial transaction data in a computer readable storage memory such that the non-financial transaction data is associated with the data for performing the financial transaction.

17. A computer-implemented method comprising:
receiving, by a processor of a reader device, non-financial transaction data relating to a financial transaction from a payment device comprising a memory storing the non-financial transaction data;
storing, in a computer readable storage memory of the reader device, data for performing the financial transaction;
storing, in the computer readable storage memory of the reader device, non-financial data including the non-financial transaction data received from the payment device;
transmitting the stored data for performing the financial transaction in a financial transaction authorization request message to one of an acquirer or a payment processor;
receiving a financial transaction authorization response message from one of the acquirer or the payment processor to complete the financial transaction;
after receiving the financial transaction authorization response message, transmitting the non-financial data from the reader device to the payment processor; and
after transmitting the non-financial data, erasing the non-financial data from the computer readable storage memory of the reader device.

18. The computer-implemented method of claim 17, wherein the non-financial data being transmitted is part of periodic transmissions of non-financial data.

19. The computer-implemented method of claim 17, wherein the non-financial data being transmitted includes non-financial transaction data relating to a plurality of financial transactions.

20. A non-transitory computer readable storage medium encoded with program code, wherein when the program code is executed by a processor, the processor performs a method, the method comprising:
receiving data from a payment device, wherein the data includes non-financial transaction data relating to a financial transaction stored in a memory of the payment device;
storing financial transaction data and non-financial data including the non-financial transaction data received from the payment device in a computer readable storage memory;

transmitting the financial transaction data in a financial transaction authorization request message to one of an acquirer or a payment processor;

receiving a financial transaction authorization response message from one of the acquirer or the payment processor;

after receiving the financial transaction authorization response message, transmitting the non-financial data to the payment processor; and after transmitting the non-financial data, erasing the non-financial data from the computer readable storage memory.

21. A financial transaction system, comprising:

a computer readable storage medium; and a processor in communication with the computer readable storage medium, the processor configured to:

receive data from a payment device, wherein the data includes non-financial transaction data relating to a financial transaction stored in a memory of the payment device;

store data for performing a financial transaction and non-financial data including the non-financial transaction data received from the payment device in a computer readable storage memory;

transmitting the stored data for performing the financial transaction in a financial transaction authorization request message to one of an acquirer or a payment processor;

receiving a financial transaction authorization response message from one of the acquirer or the payment processor to complete the financial transaction;

after receiving the financial transaction authorization response message, transmitting the non-financial data to the payment processor; and after transmitting the non-financial data, erasing the non-financial data from the computer readable storage memory.

22. The financial transaction system of claim 21, wherein the non-financial data being transmitted is part of periodic transmissions of non-financial data.

23. The financial transaction system of claim 21, wherein the non-financial data being transmitted includes non-financial transaction data relating to a plurality of financial transactions.

* * * * *